United States Patent
Brown et al.

(10) Patent No.: US 7,924,798 B1
(45) Date of Patent: Apr. 12, 2011

(54) METHOD FOR TRANSMITTING DATA IN A WIRELESS TELECOMMUNICATIONS NETWORK USING MULTIPLE DATA CHANNELS

(75) Inventors: Lisa J. Brown, Lees Summit, MO (US); Joel E. Campbell, Parkland, FL (US); James B. Flack, Overland Park, KS (US); Hugh H. Fletcher, Overland Park, KS (US); Robert W. Hammond, Overland Park, KS (US); Terry T. Yu, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2074 days.

(21) Appl. No.: 10/306,270

(22) Filed: Nov. 27, 2002

(51) Int. Cl.
*H04W 4/00* (2009.01)
(52) U.S. Cl. ........ 370/341; 370/473; 370/468; 370/474; 370/476; 375/260; 455/450; 455/452.2
(58) Field of Classification Search ................ 455/450, 455/452.2; 370/341, 473, 468, 474, 476; 375/260
See application file for complete search history.

(56) References Cited

U.S. PATENT DOCUMENTS

| | | | | |
|---|---|---|---|---|
| 6,973,037 | B1 * | 12/2005 | Kahveci | 370/236 |
| 6,993,353 | B2 * | 1/2006 | Desai et al. | 455/500 |
| 7,113,521 | B2 * | 9/2006 | Miller et al. | 370/474 |
| 7,136,619 | B2 * | 11/2006 | Zhang | 455/11.1 |
| 7,535,929 | B2 * | 5/2009 | Singhai et al. | 370/473 |
| 2002/0122385 | A1 * | 9/2002 | Banerjee | 370/229 |
| 2003/0039250 | A1 * | 2/2003 | Nichols et al. | 370/394 |
| 2003/0108063 | A1 * | 6/2003 | Joseph et al. | 370/465 |

FOREIGN PATENT DOCUMENTS

WO  WO 99/18712  4/1999

OTHER PUBLICATIONS

"Bandwidth Aggregation, Teaming and Bonding," Vicomsoft, http://www.vicomsoft.com/knowledge/reference/bondteam.html, printed Jul. 18, 2002.
"ePipe 2000 Family Key Networking Concepts," Stallion Technologies, http://www.stallion.com.au/html/userdoc/epipe/epipe-key-concepts-3.html, printed Jul. 18, 2002.
"PPP Multilink Protocol," http://www.microsoft.com/WINDOWS2000/techinfo/reskit/en/Intwork/inbb_ras_zbct. htm, printed Mar. 27, 2002.
Internet Engineering Task Force ("IETF") Request for Comments ("RFCs") 768, "User Datagram Protocol," J. Postel, Aug. 1980.
Internet Engineering Task Force ("IETF") Requests for Comments ("RFCs") 791, "Internet Protocl DARPA Internet Program Protocol Specification," Information Sciences Institute, Sep. 1981.
Internet Engineering Task Force ("IETF") Request for Comments ("RFCs") 793, "Transmission Control Protocol DARPA Internet Program Protocol Specification", Information Sciences Institute, Sep. 1981.
Internet Engineering Task Force ("IETF") Request for Comments ("RFCs") 1541, "Dynamic Host Configuration Protocol," R. Droms, Oct. 1993.

(Continued)

*Primary Examiner* — Patrick N Edouard
*Assistant Examiner* — Shantell Heiber

(57) ABSTRACT

A device can connect to a packet data network through a first data channel, such as a connection with a wireless telecommunications network. The device can additionally connect to the packet data network through a second data channel. The device can simultaneously transmit data over the first and second data channels. Data channels can be added or removed in order to change the bandwidth available to the device.

20 Claims, 12 Drawing Sheets

OTHER PUBLICATIONS

Internet Engineering Task Force ("IETF") Request for Comments ("RFCs") 1661, "The Point-to-Point Protocol (PPP)," W. Simpson, Jul. 1994.

Internet Engineering Task Force ("IETF") Request for Comments ("RFCs") 1662, "PPP in HDLC-like Framing," W. Simpson, Jul. 1994.

Internet Engineering Task Force ("IETF") Request for Comments ("RFCs") 1663, "PPP Reliable Transmission," D. Rand, Jul. 1994.

Internet Engineering Task Force ("IETF") Request for Comments ("RFCs") 1990, "The PPP Multilink Protocol (MP)," K. Sklower, Aug. 1996.

Internet Engineering Task Force ("IETF") Request for Comments ("RFCs") 2131, "Dynamic Host Configuration Protocol," R. Droms, Mar. 1997.

Internet Engineering Task Force ("IETF") Request for Comments ("RFCs") 2132, "DHCP Options and BOOTP Vendor Extensions," S. Alexander, Mar. 1997.

Internet Engineering Task Force ("IETF") Request for Comments ("RFCs") 2138, "Remote Authentication Dial In User Service (RADIUS)," C. Rigney Livingston, Apr. 1997.

Internet Engineering Task Force ("IETF") Request for Comments ("RFCs") 2139, "RADIUS Accounting," C. Rigney, Apr. 1997.

Internet Engineering Task Force ("IETF") Request for Comments ("RFCs") 2924, "Accounting Attributes and Record Formats," N. Brownlee, Sep. 2000.

Bram Cohen, "BitTorrent Protocol Documentation," www.bitconjurer.org (Sep. 26, 2002 archive, retrieved from web.archive.org).

* cited by examiner

METHOD FOR TRANSMITTING DATA IN A WIRELESS TELECOMMUNICATIONS NETWORK USING MULTIPLE DATA CHANNELS

FIELD OF THE INVENTION

The present invention relates generally to wireless telecommunications networks. More specifically, it relates to data transmission in wireless telecommunications networks.

BACKGROUND OF THE INVENTION

A computer can connect to a remote device, such as one on the Internet. For example, the computer may use a modem to dial in to an Internet Service Provider ("ISP"). The ISP can in turn provide connectivity to the Internet. Alternatively, the computer may use a wireless device to access a wireless telecommunications network, which can also provide connectivity to the Internet.

Once connected to the Internet, the computer can establish a data session with the remote device. After establishing the data session, the two devices can exchange data. The data session, however, is generally limited to an available bandwidth based on the type of connection the computer uses to access the Internet. The available bandwidth determines how quickly data can be exchanged between the computer and the remote device. When the computer and the remote device exchange large amounts of data, increasing the bandwidth can shorten the amount of time required to complete the exchange of data.

One method that can increase bandwidth is connection teaming. In connection teaming, the computer connects to a server, and the server provides access to the Internet through multiple data links. The server establishes a separate session with the remote device over each of the data links, thereby increasing the bandwidth of the server's connection with the remote device. Although the server connects to the remote device over multiple data links, the server ordinarily connects to the computer using a single data link. The single data link can create a bottleneck in transmitting data between the server and the computer.

Additionally, connection teaming does not typically split up individual data requests. For example, if the computer requests a large file from the remote device, the file will be sent to the server as part of a single session, and it will be sent using only one of the data links. The other data links would not be used to receive the file from the remote device. Once received at the server, the file can be sent over the data link between the server and the computer. Therefore, connection teaming would not provide a noticeable improvement in the data transmission speed when transmitting large files.

Point-to-Point Protocol ("PPP") Multilink is another method that can be used to increase bandwidth. PPP provides a method for the computer to format and exchange data with another device, such as a server at the ISP. PPP generally runs below other protocols, such as the Transmission Control Protocol ("TCP") and the Internet Protocol ("IP"). Thus, the computer could establish a connection with the remote device using the TCP/IP protocols. TCP/IP packets could be sent from the remote device to the ISP server. Once received at the ISP server, the TCP/IP packets could be placed into smaller PPP packets for transmission to the computer.

PPP Multilink is an extension to PPP that allows data in a single logical connection to be transmitted over multiple physical links. While the TCP/IP packets would normally be transmitted from the ISP server to the computer using a single physical link for the PPP session, PPP Multilink allows the packets to be transmitted to the computer over multiple physical links. Using multiple physical links can increase the data transmission rate between the ISP server and the computer, thereby also increasing the data transmission rate between the remote device and the computer. Likewise, PPP Multilink can increase the data transmission rate for sending packets from the computer to the ISP server.

The PPP Multilink standard, however, is limited to analog data links, such as analog modems and Integrated Digital Services Network ("ISDN") connections. PPP Multilink, therefore, could not be used when the computer connects to the wireless telecommunications network using one or more data sessions. PPP Multilink can also only be used when the computer establishes a PPP session with the ISP server or with another device.

Therefore, there is exists a need for an improved method of increasing data transmission rates in a wireless telecommunications network.

SUMMARY OF THE INVENTION

A device can connect to a packet data network, such as the Internet, through a first data channel. The first data channel can be, for example, a voice or data session with a wireless telecommunications network. The wireless telecommunications network can in turn provide connectivity to the packet data network. The device can additionally connect to the packet data network through a second data channel. The second data channel can be, for example, an analog modem line, a wireless telecommunications network voice or data session, or another type of data channel.

The device can establish a data session with a remote device that is also connected to the packet data network. Then, packets in the data session with the remote device can be transmitted using both the first and second data channels. During the data session, the available bandwidth can be varied by adding or removing data channels.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

Figure 1:
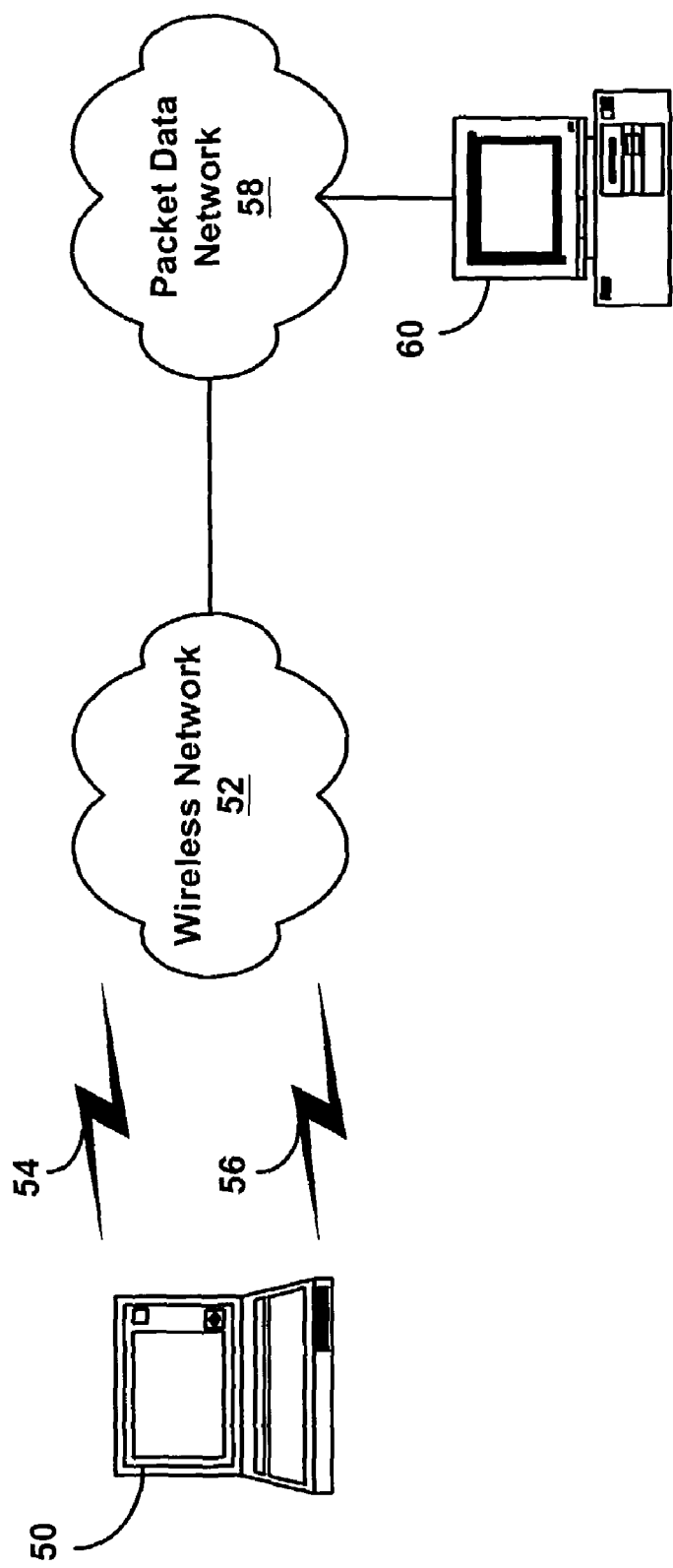
FIG. 1 shows an exemplary system that can be used transmit data in a wireless telecommunications network using multiple data channels.

FIG. 1 shows an exemplary architecture that can be used to aggregate data in a wireless telecommunications network. A computer 50 interfaces with a wireless telecommunications network 52 through two data channels 54, 56. The wireless telecommunications network 52 in turn provides connectivity to a packet data network 58, such as the Internet, an intranet or another network. Using this connectivity, the computer 50 can communicate with a remote device 60 that is also connected to the packet data network 58.

The two data channels 54, 56 can be used to aggregate data sent between the computer 50 and the wireless telecommunications network 52. In an exemplary operation, the computer 50 can engage in a communication session with the remote device 60. Packets for the communication session can be transmitted using either of the two data channels 54, 56. For example, some packets can be transmitted over the first data channel 54 while other packets can be transmitted over the second data channel 56. Using two data channels 54, 56 can allow the computer 50 to increase the overall data rate for the communication session with the remote device.

Figure 2:
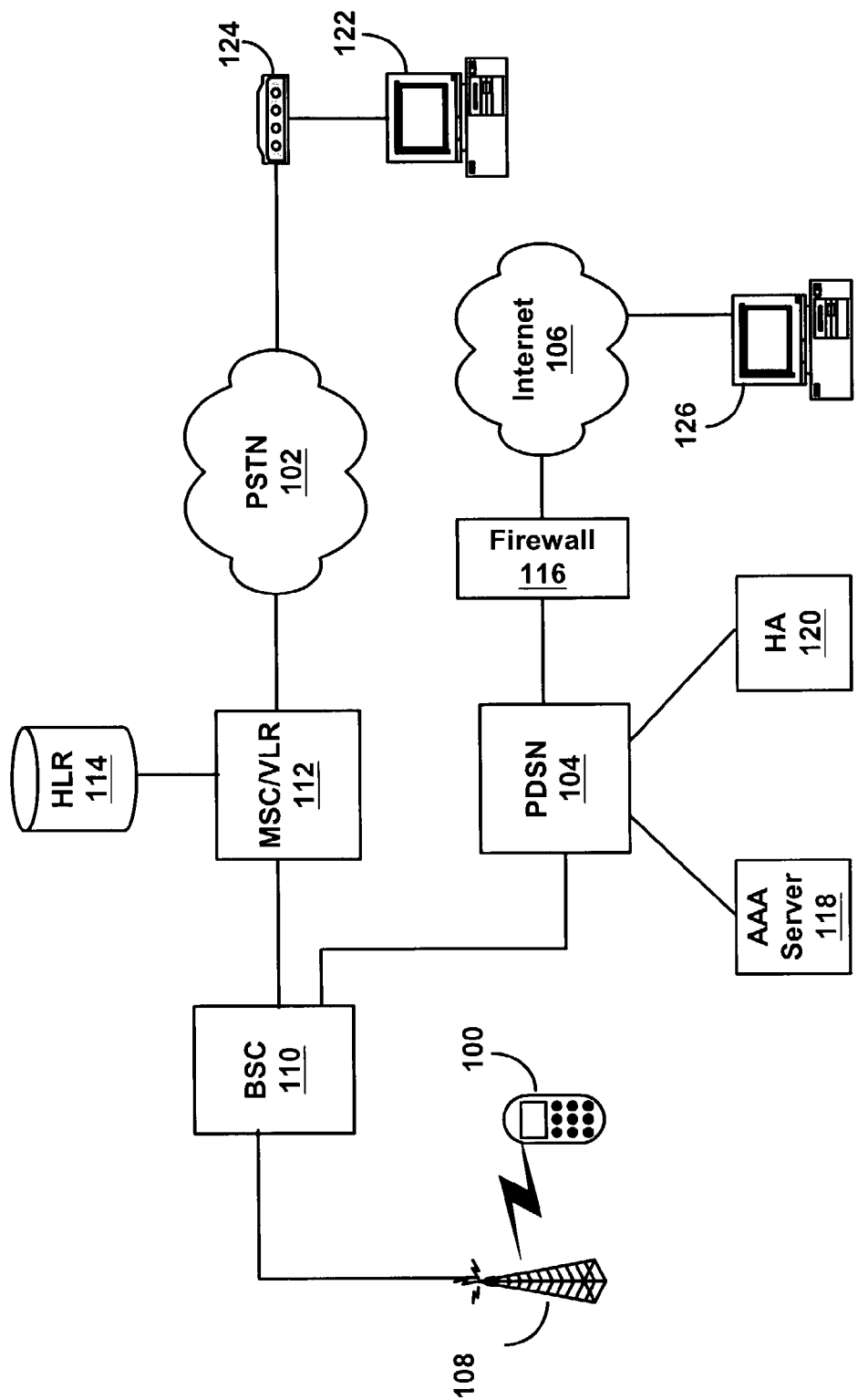
FIG. 2 shows an exemplary architecture for a wireless telecommunications network that may be used as the wireless telecommunications network depicted in FIG. 1.

FIG. 2 shows an exemplary architecture for a wireless telecommunications network that may be used as the wireless telecommunications network 52 depicted in FIG. 1. In one exemplary embodiment, a wireless device 100 connects with the wireless telecommunications network over a wireless interface. In turn, the wireless telecommunications network may provide connectivity to the public switched telephone network ("PSTN") 102. The wireless telecommunications network may also provide connectivity to a packet data serving node ("PDSN") 104, which in turn can provide connectivity to a packet data network, such as the Internet 106. Through this connectivity, the wireless device 100 may communicate with a device on one of these networks.

The wireless device 100 may be a wireless telecommunications phone, a personal digital assistant ("PDA"), a pager, a two-way radio, a wirelessly equipped computer or another wireless device. While FIG. 2 depicts one wireless device 100 connected to the wireless telecommunications network, the wireless telecommunications network may include a plurality of wireless devices 100. Also, more than one type of wireless device 100 may connect to the wireless telecommunications network. For example, a wireless telecommunications phone, a PDA and other devices could all connect to the wireless telecommunications network at the same time.

As shown in FIG. 2, the wireless device 100 links to a base transceiver station ("base station") 108 through an air interface. The wireless device 100 can communicate with the base station 108 using a variety of different protocols. In an exemplary embodiment, the wireless device 100 communicates with the base station 108 using Code Division Multiple Access ("CDMA"), such as in a CDMA2000 3G packet data network. CDMA provides a method for sending wireless signals between the wireless device 100 and the base station 108. In a CDMA system, the base station 108 communicates with the wireless device 100 over a spread spectrum of frequencies.

In a CDMA system, multiple wireless devices may use the same frequency range, and the multiple wireless devices may each simultaneously communicate with the base station 108 using the same frequency range. The wireless device 100 in a CDMA system spreads its signal across the frequency range. Spreading the signal across a wide bandwidth, such as approximately 1.266 MHz, can reduce interference between signals from different wireless devices. This can allow individual signals to be differentiated from other signals, and therefore, accurately recovered. In order to perform signal spreading, each wireless device may be assigned a unique code, such as a Walsh code. The code may be a sequence of bits, such as a 64 bit binary number; however, other lengths may also be used.

The wireless device 100 can transmit data by creating a modulated signal. The modulated signal may be created, for example, by modulating the wireless device's unique code with the data to be transmitted. In creating the modulated signal, the modulation bit rate of the code is ordinarily greater than the bit rate of the data. Once the modulated signal is created, it can then be sent over the common frequency range to the base station 108.

To accurately recover the modulated signal, the base station 108 can also store the unique code used by the wireless device 100. Then, the base station 108 can monitor the frequency range for signals having the modulation pattern of the wireless device's code. This allows the base station 108 to differentiate the signal of the wireless device 100 from the signals of other the other wireless devices, which can appear as noise. After recovering the modulated signal, the base station 108, or other device, can then recover the data from the modulated signal. For example, the base station 108 can demodulate the modulated signal using the unique code for the wireless device 100. Communication from the base station 108 to the wireless device can occur in a similar manner, although it may occur in a different frequency range.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other protocols may also be used for communication between the wireless device 100 and the base station 108. For example, the wireless device 100 and the base station 108 may communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Wireless Application Protocol ("WAP"), Time Division Multiple Access ("TDMA") or other protocols. Additional wireless protocols, such Institute of Electrical and Electronics Engineers ("IEEE") 802.11, Bluetooth and others may also be used.

The base station 108 couples to a base station controller ("BSC") 110, which can perform various functions such as managing handoffs of the wireless device 100 as it moves among base stations. The BSC 110 in turn connects to a mobile switching center ("MSC") 112. The MSC 112 can manage setup and teardown of connections with the wireless device 100. While the BSC 110 and the MSC 112 are depicted as separate components, it is possible that their functionality may be combined into a single component.

The MSC 112 may also include a visitor location register ("VLR"). The VLR may be used to track wireless devices that travel away from their "home" MSCs to other MSCs. The VLR may receive information about a roaming wireless device from the roaming wireless device's home HLR, and it may store that information. When the roaming wireless device travels away from the MSC, the VLR may then remove information about that roaming wireless device.

Additionally, the MSC 112 may connect to a home location register ("HLR") 114. The HLR 114 can be a database that can store subscription information for wireless devices. Also, the HLR 114 can track the current location of wireless devices. For example, when a wireless device roams away from its home MSC 112 to another MSC, the HLR 114 may be appropriately updated. Then, the HLR 114 can be used to route calls to the wireless device.

The MSC 112 can additionally provide connectivity to the PSTN 102. Using the connectivity, the wireless device 100 may then communicate with another device that is also connected to the PSTN 102 or another device on the wireless telecommunications network. For example, the wireless device 100 could communicate with a computer 122 that connects to the PSTN 102 via a modem 124. While FIG. 2 depicts the modem 124 as a separate component from the computer 122, the modem 124 may alternatively be integrated into the computer 122. Using the modem 124, the computer 122 can send and receive data over a connection with the PSTN 102. Of course, the computer 122 is exemplary in nature and other devices, such as personal digital assistants ("PDAs"), fax machines, printers, Internet appliances and other remote devices can also be used. Additionally, the wireless device 100 may communicate with more than one device connected to the PSTN 102.

In addition to connecting to the MSC 112, the BSC 110 may also connect with a PDSN 104. The PDSN 104 can provide connectivity to a packet data network, such as the Internet 106, an intranet or another network. The PDSN 104 may connect to the Internet 106 through a firewall 116. The firewall 116 can be used to provide protection for the PDSN 104, for example by restricting access from the Internet 106 back through the firewall 116 to the PDSN 104. Once the wireless device 100 connects, for example, to the Internet 106, it can exchange data with other devices that are also connected to the Internet 106.

For example, the wireless device 100 can communicate with a computer 126 that is connected to the Internet. The computer 126 can connect to the Internet 106 in a variety of different ways. For example, it may be on a local area network ("LAN") which in turn receives connectivity to the Internet 106, such as through an Internet Service Provider ("ISP"). Of course, other ways of connecting to the Internet 106 exist, and these may also be used. While FIG. 2 depicts the computer 126 connected to the Internet 106, other devices, such as PDAs, fax machines, printers, Internet appliances or other remote devices could also be used. Additionally, the wireless device 100 may communicate with more than once device connected to the Internet 106.

In connecting to the wireless telecommunications network, the wireless device 100 may establish a Point-to-Point Protocol ("PPP") session with the PDSN 104. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher-level protocol options for communication between the two devices.

During the establishment of the PPP session, the PDSN 104 may access an Authentication, Authorization, and Accounting ("AAA") server 118. The AAA server 118 can authenticate the wireless device 100, for example using a network access identifier ("NAI") and a password provided by the wireless device 100. In addition to authorizing access, the AAA server 118 may also track the service provided to the wireless device 100 in order to provide billing or other accounting functions. The PDSN 104 may communicate with the AAA server 118, for example, using a Remote Authentication Dial In User Service ("RADIUS") interface.

As a further part of establishing the PPP session, the wireless device 100 may be assigned an Internet Protocol ("IP") address. This may be done, for example, after the wireless device 100 has been authorized to access the wireless telecommunications network. The IP address may be used by the wireless device 100 to communicate in data sessions with other devices. While the wireless device 100 may have a pre-assigned IP address, its IP address is usually assigned at connection time. This may be done, for example, by using a Dynamic Host Control Protocol ("DHCP") application program. The DHCP application program may run on the PDSN 104, or it may run on another element. When the wireless device 100 establishes a PPP session with the PDSN 104, the DHCP application program may assign the wireless device 100 an IP address to use for that connection.

PPP is described in more detail in Internet Engineering Task Force ("IETF") Request for Comments ("RFCs") 1661, 1662 and 1663, all of which are incorporated herein by reference in their entirety. DHCP is described in more detail in IETF RFCs 1541, 2131, 2132, which are all incorporated herein by reference in their entirety. RADIUS is described in more detail in IETF RFC 2138 and 2139, each of which is incorporated herein by reference in its entirety. AAA is described in more detail in IETF RFC 2924, which is incorporated herein by reference in its entirety. More information on these and other IETF standards may be found at the URL "www.ietf.org."

Once connected to the PDSN 104, for example through a PPP session, the wireless device 100 can access the Internet 106. While the wireless device 100 may communicate with the PDSN 104 through a PPP session, it may communicate with other devices using higher-level protocols. For example, the wireless device 100 may use the Transmission Control Protocol ("TCP") and IP to communicate with other devices on the Internet 106. TCP/IP is one protocol suite that may be used for transmitting data over a packet-switched network. IP provides a method for transmitting data between devices on the same or on different networks. TCP is a connection-oriented protocol used to send data between devices connected over a network, and it provides additional features over IP, such as reliable end-to-end transmission of data. When used in conjunction, TCP and IP provide a format for breaking a data message into packets, transmitting the packets over the network to a receiver, and reassembling the packets at the receiver to form the original data message.

In IP communications, each device may be assigned an IP address, which is 32-bits long. The IP address assigned to a device is usually globally unique, and this allows data to be accurately sent between devices on different networks. Data to be transmitted between devices is placed into an IP packet. The IP packet can include a header portion and a data portion. The header portion generally identifies a source device and a destination device, while the data portion carries the data to be transmitted between the two devices.

Figure 3:
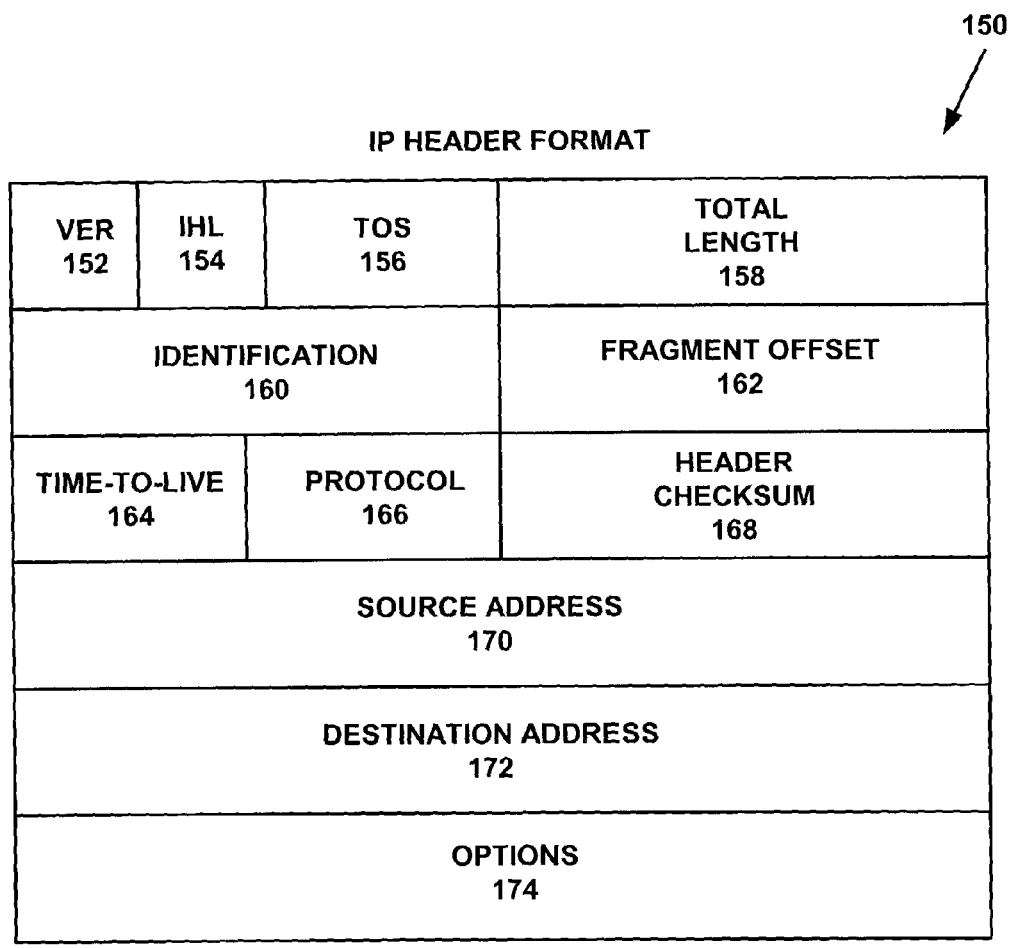
FIG. 3 is a block diagram illustrating an IP packet header.

FIG. 3 is a block diagram illustrating an IP packet header 150. The IP packet header 150 includes a number of different fields. The version field 152 can indicate an IP version, such as IPv4 or IPv6. The Internet Header Length ("IHL") field 154 can indicate the length of the header. The Type-of-Service ("ToS") field 156 can indicate a requested type of service. The total length field 158 can indicate the length of everything in the IP packet, including the IP header 150. The identification-field 160 may be used for packet fragmentation. The fragment offset field 162 can also be used for packet fragmentation. The Time-To-Live ("TTL") field 164 can be a hop count, which is used to limit the lifetime of the IP packet.

The protocol field 166 can indicate a protocol used with the IP packet. For example, TCP, User Datagram Protocol ("UDP"), Encapsulating Security Payload ("ESP"), and Authentication Header ("AH") are common protocols that may be used in conjunction with IP. Other protocols may be used as well. The header checksum field 168 can be used to verify the contents of the IP packet header 150. The source address field 170 may include a source IP address for a sending device, and the destination address field 72 may include a destination IP address for a receiving device. The options field 174 can be used for security, source routing, error reporting, debugging, time stamping or other information. IP data may be carried in the IP packet data portion, which is generally appended below the options-field 174.

The IP packet is sent over the network, and, using the IP address in the destination address field 172 of the IP packet header 150, appropriately routed to the destination device. The packet may travel through different devices and across different networks before ultimately reaching its destination. The IP address can help to provide accurate routing through the intermediate devices to the intended destination device.

IP, however, does not provide a mechanism to assure that packets will be received at their intended destination. They may be lost during transmission due to data corruption, buffer overflow, equipment failure or other problems. TCP complements IP by ensuring reliable end-to-end transmission of the packets. Among other functions, TCP handles lost or corrupted packets, and it reassembles packets that arrive at their destination out of order. IP is described in more detail in IETF RFC 791, which is incorporated herein by reference in its entirety. TCP is described in more detail in IETF RFC 793, which is incorporated herein by reference in its entirety.

TCP/IP is one method for sending data between two devices, and other Internet or network protocols may also be used. For example, the User Datagram Protocol ("UDP") may be used in conjunction with IP to exchange data between devices. UDP provides a connectionless protocol for exchanging data between devices, such as devices connected over an IP network. UDP does not guarantee reliable transmission between the devices, and it provides only minimal error protection. UPD is described in further detail in IETF RFC 768, which is incorporated herein by reference in its entirety.

With reference to FIG. 2, the wireless device 100 can engage in a TCP/IP session with the computer 122 that is connected to the PSTN 102. Once the TCP/IP session is established, the wireless device 100 and the computer 122 can exchange data using TCP/IP packets. TCP/IP packets can be sent from the wireless device 100 to the computer 122, and also from the computer 122 to the wireless device 100.

Similarly, the wireless device 100 can engage in a TCP/IP session with the computer 126 that is connected to the Internet 106. The computer 126 and the wireless device 100 can exchange data using TCP/IP packets. The TCP/IP packets can be sent from the computer 126 to the wireless device 100, and they can also be sent from the wireless device 100 to the computer 126.

Figure 4:
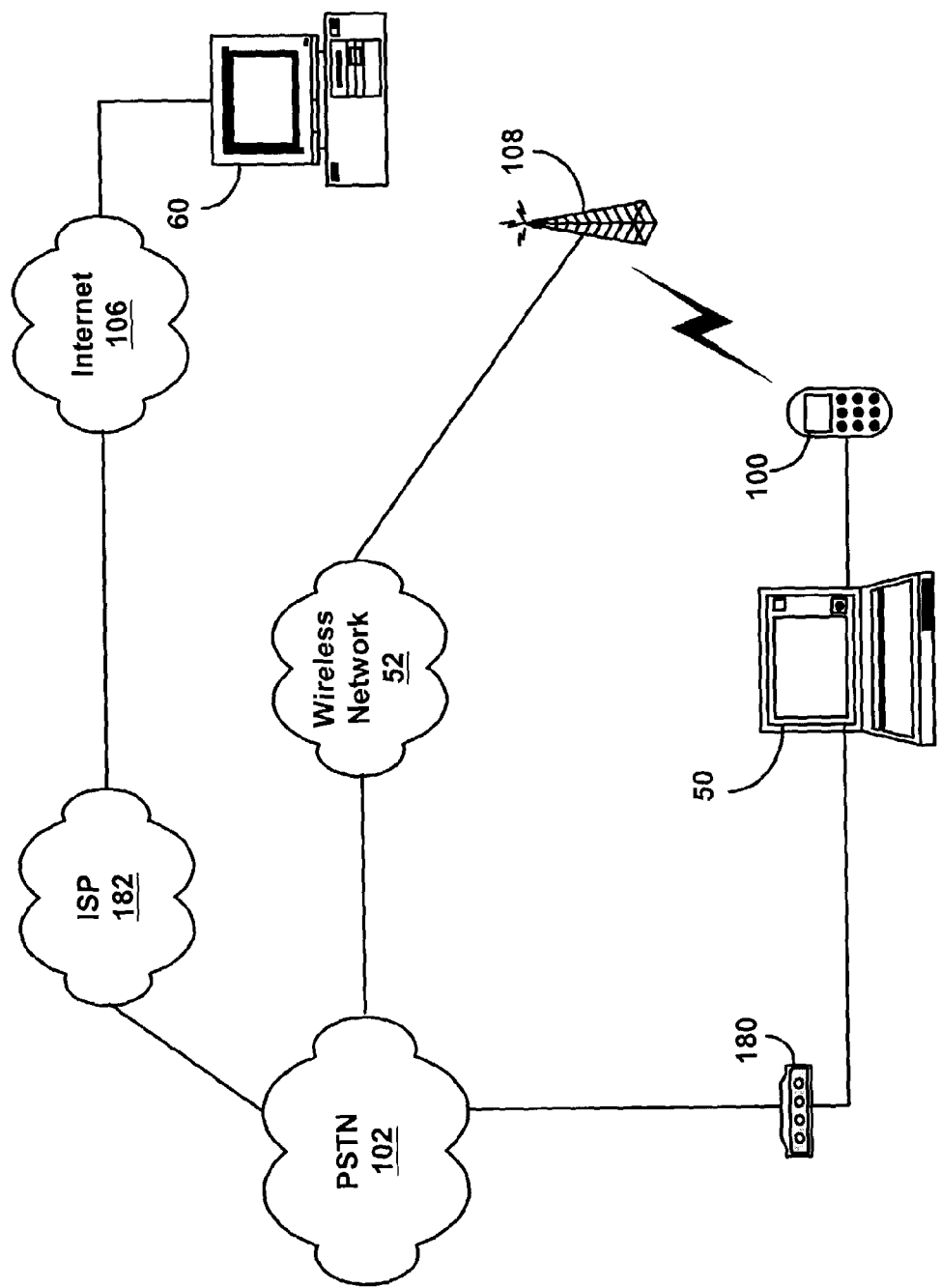
FIG. 4 is an exemplary embodiment of the system of FIG. 1 for transmitting data in a wireless telecommunications network using multiple data channels.

FIG. 4 is an exemplary embodiment of the system of FIG. 1 for transmitting data in a wireless telecommunications network using multiple data channels. In this configuration, the computer 50 transmits data over one data channel using an analog modem, and it transmits data over another data channel using a wireless telecommunications network voice session. It should be understood that while FIG. 4 depicts a laptop computer 50, any type of computer may be used, and many other types of devices may also be used. For example, an Internet appliance, fax machine, printer, personal digital assistant ("PDA") or other type of data device may be used in place of the computer 50. Additionally, while FIG. 4 shows two data channels, alternate embodiments may use a greater number of data channels.

As depicted in FIG. 4, the computer 50 interfaces with the wireless device 100. This can be done, for example, by connecting the wireless device 100 to a port of the computer 50, such as a Universal Serial Bus ("USB") port. Of course, other types of ports can also be used. The wireless device 100 communicates with the base station 108 over an air interface. The base station 108 in turn provides connectivity to the wireless telecommunications network 52. The wireless telecommunications network 52 can interface with an ISP 182 through the PSTN 102, and the ISP 182 can provide a connection to the Internet 106. Thus, the interface with the Internet 106 through wireless telecommunications network 52 can serve as one of the two data channels 54, 56 depicted in FIG. 1.

In this embodiment, the wireless device 100 communicates with the wireless telecommunications network 52 using a voice session. While the voice session can be used to send voice traffic, such as would be done in a voice call, it can alternatively be used to send data. As previously described, the wireless telecommunications network 52 can be a CDMA2000 3G wireless telecommunications network. Of course, the wireless telecommunications network 52 could also be a 2G, 2.5G, or another type of wireless telecommunications network, and protocols other than CDMA may also be used. The data transmission speed over the voice session can vary based on the particular type of wireless telecommunications network.

The computer 50 can additionally use a modem 180 to interface with the PSTN 102. While FIG. 4 depicts the modem 180 as a separate component from the PSTN 102, the modem 180 can alternatively be an internal modem. The PSTN 102 can also interface with the ISP 182, and the ISP 182 can interface with the Internet 106. Using this connectivity, data sent via the modem 180 can be routed through the ISP 182 to the Internet 106. The interface with the Internet 106 through the modem 180 can serve as the second of the two data channels 54, 56 depicted in FIG. 1.

Both the modem 180 and the wireless device 100 can be used to access one of the two data channels 54, 56 in order to send data between the computer 50 and the remote device 60. The two data channels 54, 56 provide additional bandwidth between the computer 50 and the remote device 60, and therefore can increase the data transmission rate between the two devices 50, 60.

Figure 5:
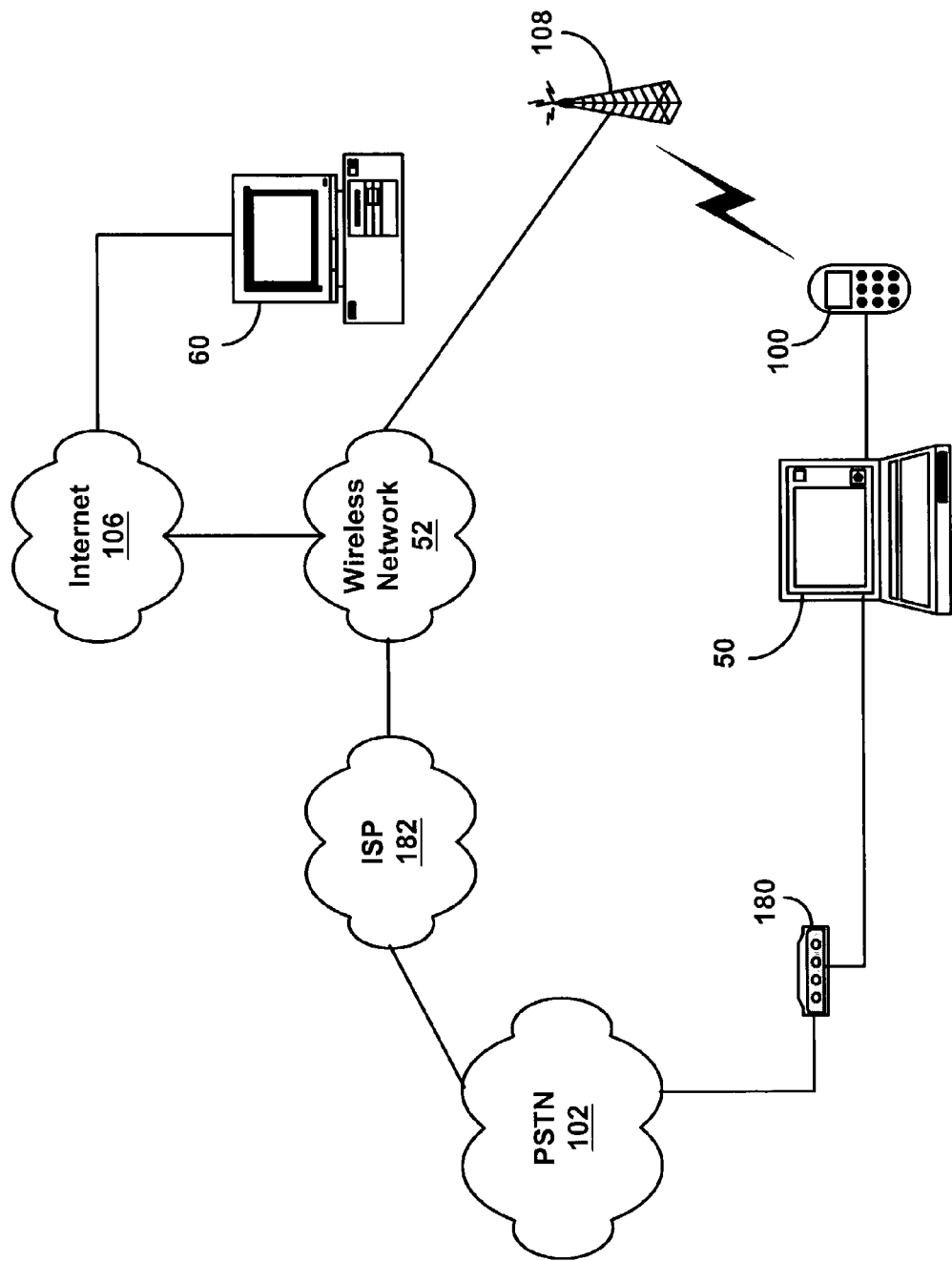
FIG. 5 is an alternate embodiment of the system of FIG. 1 for transmitting data in a wireless telecommunications network using multiple data channels.

FIG. 5 is an alternate embodiment of the system of FIG. 1 for transmitting data in a wireless telecommunications network using multiple data channels. In this configuration, the computer 50 also uses two data channels to communicate with the remote device 60. The computer 50 uses an analog modem to transmit data over one data channel. The computer 50 uses the wireless device 100 to interface with the wireless telecommunications network 52 through a data session, which can be used as the second data channel 56.

The wireless device 100 can transmit data over the wireless telecommunications network 52 using a data session instead of a voice session. The data session ordinarily provides a higher data rate than using a voice session; however, not all wireless telecommunications networks support data sessions. A 3G network, such as a CDMA2000 network, can support both voice and data sessions. Of course, other types of wireless telecommunications networks can also support both voice and data sessions, and these may also be used.

As depicted in FIG. 5, the computer 50 interfaces with the wireless device 100. The wireless device 100 communicates with the base station 108 via an air interface. The base station 108 in turn connects to the wireless telecommunications network 52. This connectivity allows the computer 50 to interface with the wireless telecommunications network 52 through the wireless device 100. The wireless telecommunications network 52 provide a connection to the Internet 106 and therefore also to the remote device 60.

Also, the computer 50 can connect to the PSTN 102 using the modem 180. The PSTN 102 in turn connects to an ISP 182. The ISP 182 connects to the wireless telecommunications network 52, which provides a connection to the Internet 106. Thus, the computer 50 can interface with the wireless telecommunications network 52 using the modem 180 and receive a connection to the Internet 106.

The modem 180 and the wireless device 100 may each be used to access one of the two data channels 54, 56 depicted in FIG. 1. The computer 50 can use both the modem 180 and the wireless device 100 to interface with the wireless telecommunications network 52. The wireless telecommunications network 52 provides connectivity to the Internet 106, which allows the computer to communicate with the remote device 60. By using both the modem 180 and the wireless device 100 to communicate with the remote device 60, the bandwidth between the computer 50 and the remote device 60 can be increased.

While FIG. 5 depicts two data channels, alternate embodiments can use a greater number of data channels. In one alternate embodiment, the computer 50 can use two modems and a wireless telecommunications network data session. In another alternate embodiment, the computer 50 can use a modem and two wireless telecommunications network data sessions. Of course, these examples are not exhaustive, and many other combinations can also be used.

Figure 6:
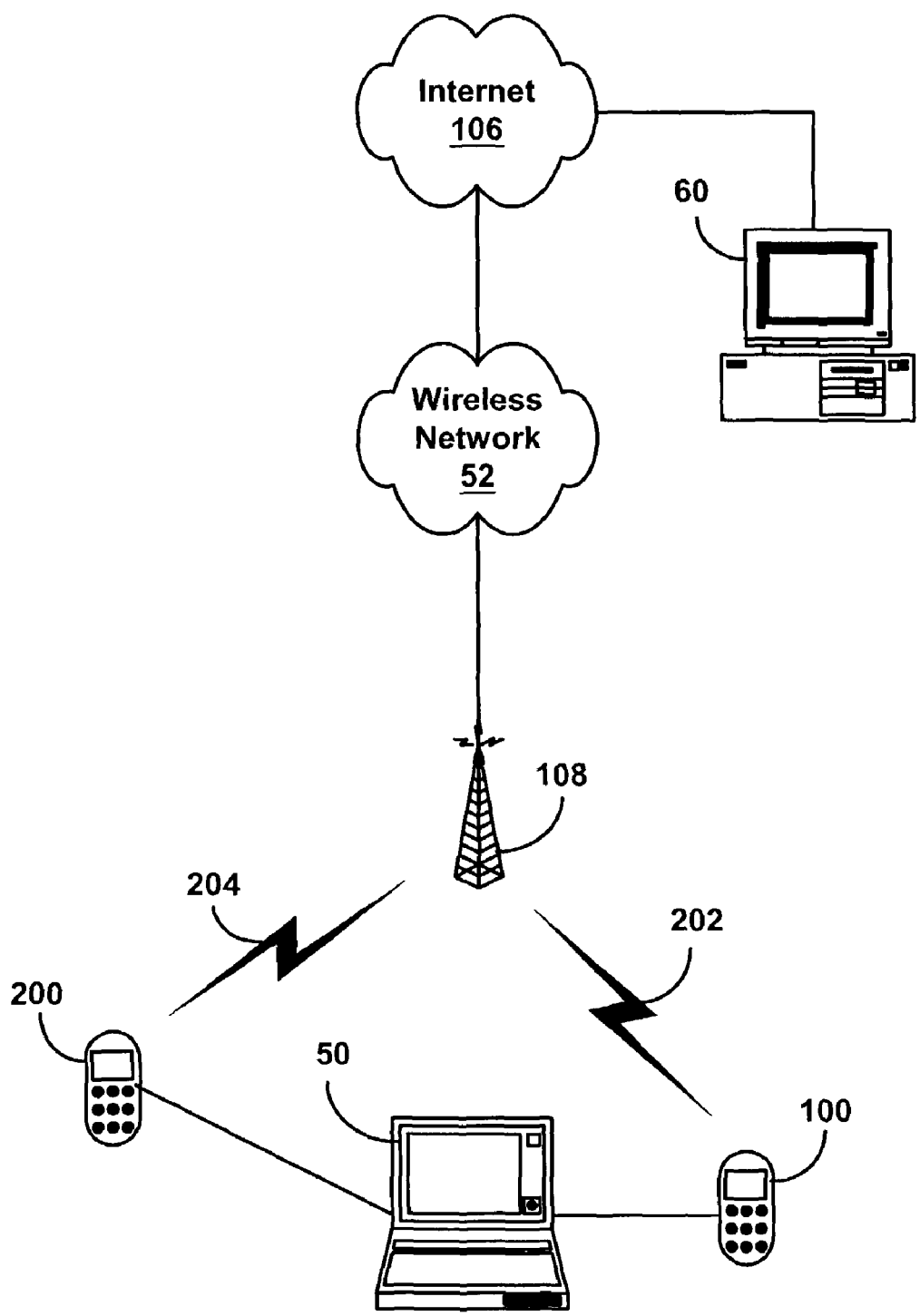
FIG. 6 is another alternate embodiment of the system of FIG. 1 for transmitting data in a wireless telecommunications network using multiple data channels.

FIG. 6 is another alternate embodiment of the system of FIG. 1 for transmitting data in a wireless telecommunications network using multiple data channels. In this embodiment, the computer 50 also uses two data channels to communicate with the remote device 60. The computer 50 interfaces with the wireless telecommunications network 52 using two different data sessions, which serve as the two data channels. While FIG. 6 depicts the computer 50 using two data sessions, alternate embodiments can use a greater number of data sessions.

The computer 50 uses the wireless device 100 to communicate with the base station 108. The wireless device 100 communicates with the base station 108 over a first communication interface 202. The first communication interface 202 can be the air interface with the base station 108. The wireless device 100 can communicate with the base station 108 over the first communication interface 202 using a CDMA session, and it can send data over the first communication interface 202 using a unique Walsh code.

The computer 50 also uses a second wireless device 200 to communicate with the wireless telecommunications network 52. The second wireless device 200 uses a second communication interface 204 to communicate with the base station 108. The second communication interface 204 can also be an air interface with the base station 108. The wireless device 200 can send data over the second communication interface 204, for example, by using a different Walsh code than is used over the first communication interface 202.

Using the two wireless devices 100, 200, the computer 50 can engage in two separate data sessions with the wireless telecommunications network 52. The wireless telecommunications network 52 provides connectivity to the Internet 106, which allows the computer 50 to exchange data with the remote device 60 the two data sessions. The two data sessions with the wireless telecommunications network 52 can increase the overall data transmission rate between the computer 50 and the remote device 60.

Table 1 shows exemplary data transmission rates that can be achieved by the computer 50 using multiple data channels. It should be understood, however, that the data transmission rates depicted in Table 1 are merely exemplary in nature, and they are based on theoretical transmission rates for the different data channels. The actual data transmission rates can vary depending on many different factors, such as the type of wireless telecommunications network, the signal-to-noise ratio over the wireless telecommunications network's air interface, the number of users connected to the wireless telecommunications network, the signal-to-noise ratio over the modem's analog phone line and many other factors.

As depicted in Table 1, the first row represents three different data channels that can be used by the computer 50 as the first data channel 54. For example, the computer 50 can use a 2G voice session, a 3G voice session or a 3G data session. The first column also represents three different data channels that the computer 50 can use as the second data channel 56. For example, the computer 50 can use a 28.8K modem, a 56K modem or a 3G data session. Of course, these various types of data channels are exemplary in nature, and other data channels or combinations of data channels may also be used.

TABLE 1

|  | 2G Voice Session | 3G Voice Session | 3G Data Session |
|---|---|---|---|
| 28.8K Modem | 43.2K | 84.8K | 172.8K |
| 56K Modem | 70.4K | 112K | 200K |
| 3G Data Session | 158.4K | 200K | 288K |

2. Exemplary Operation

In order to support transmitting data over the multiple data channels 54, 56, a client application can run on the computer 50. The client application can be a software program, such as can be stored in memory and executed on a processor. Packets in a data session with the remote device 60 can be sent over one or more of the data channels 54, 56, and the client application can process packets for transmission over the different data channels. In one example, the client application fragments a packet, assigns the fragments for transmission over one of the data channels, and adds header information to the fragments before transmitting them over the different data channels.

In one example of processing the packets, the client application can fragment packets before transmitting them to the server. For example, the client application can divide a packet into two or more fragments. The fragments can then be transmitted to the server using the data channels. For example, some fragments can be transmitted over the first data channels 54, while other fragments can be transmitted over the second data channel 56.

In another example of processing the packets, the client application can assign the packet fragments for transmission over one of the available data channels. By distributing the fragments among the different data channels, the client application can efficiently utilize the available data channels. Of course, the fragments may be distributed among the data channels in a variety of different ways. In one exemplary embodiment, the fragments can be distributed among the data channels based on the available bandwidth of the data channels. For example, a data channel with a higher bandwidth can be assigned a greater number of fragments, and a data channel with a lower bandwidth can be assigned a fewer number of fragments.

In another example of processing packets, the client application can add a header onto the fragments before transmitting them over the different data channels. For example, the client application can communicate with a server through the data channels. The client application can send fragments to the server over the data channels. Before sending the fragments to the server, the client application can add a header onto the fragments. The header can identify the server as the recipient of the fragments.

To support packet fragmentation, the header can additionally indicate sequence information for the packet fragments. For example, the header can identify the fragments as part of a sequence, and it can also specify an order for the fragments. Once received by the server, the fragments can be reassembled to reform the original packet. Then, the server can transmit the reformed packet to the remote device 60.

One type of header that can be used is the PPP Multilink header. PPP Multilink is a protocol that allows packets in a single logical connection to be fragmented for transmission over multiple physical links. A PPP Multilink header is prepended to the fragments before they are transmitted over the physical links. The PPP Multilink header includes fields that allow the fragments to be correctly routed to their destination and also to be reassembled to reform the original packet. PPP Multilink supports two header types. One header type uses a short sequence number to identify fragments that form a packet, and the second header type uses a long sequence number.

Figure 7:
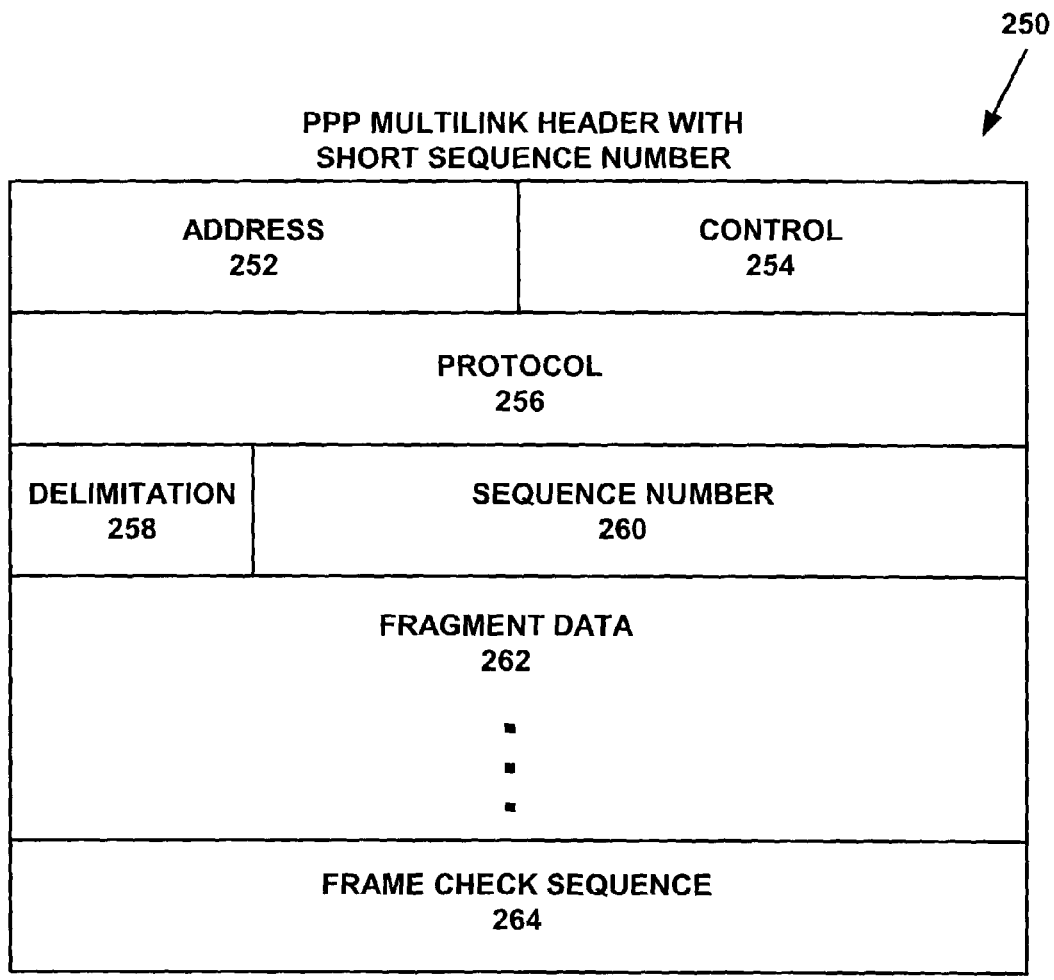
FIG. 7 is block diagram illustrating a PPP Multilink header with a short sequence number that can be used to transmit data in the system of FIG. 1.

FIG. 7 is block diagram illustrating a PPP Multilink header with a short sequence number 250 that can be used to transmit data in the system of FIG. 1. The Address field 252 specifies a destination address for the fragment. The Control field 254 can be used to set various options used in transmitting the fragment. The Protocol field 256 can identify that the fragments use the PPP Multilink protocol. The Delimitation field 258 can be used to indicate the start and the end of a sequence of fragments that form a packet. The Delimitation field 258 is four bits long. When set, the first bit is an indicator that the fragment begins a sequence of fragments corresponding to a packet. When set, the second bit indicates that the fragment ends a sequence of fragments corresponding to a packet. The other two bits are set to zero.

The Sequence Number field 260 is a twelve-bit field that indicates the position of the fragment in the sequence of fragments that corresponds to a packet. The Fragment Data field 262 carries the data. The Fragment Data field 262 is a variable length field, which varies based on the amount of data to be carried by the fragment. The Frame Check Sequence field 264 carries a frame check sequence, which can be used to detect errors in the fragment.

Figure 8:
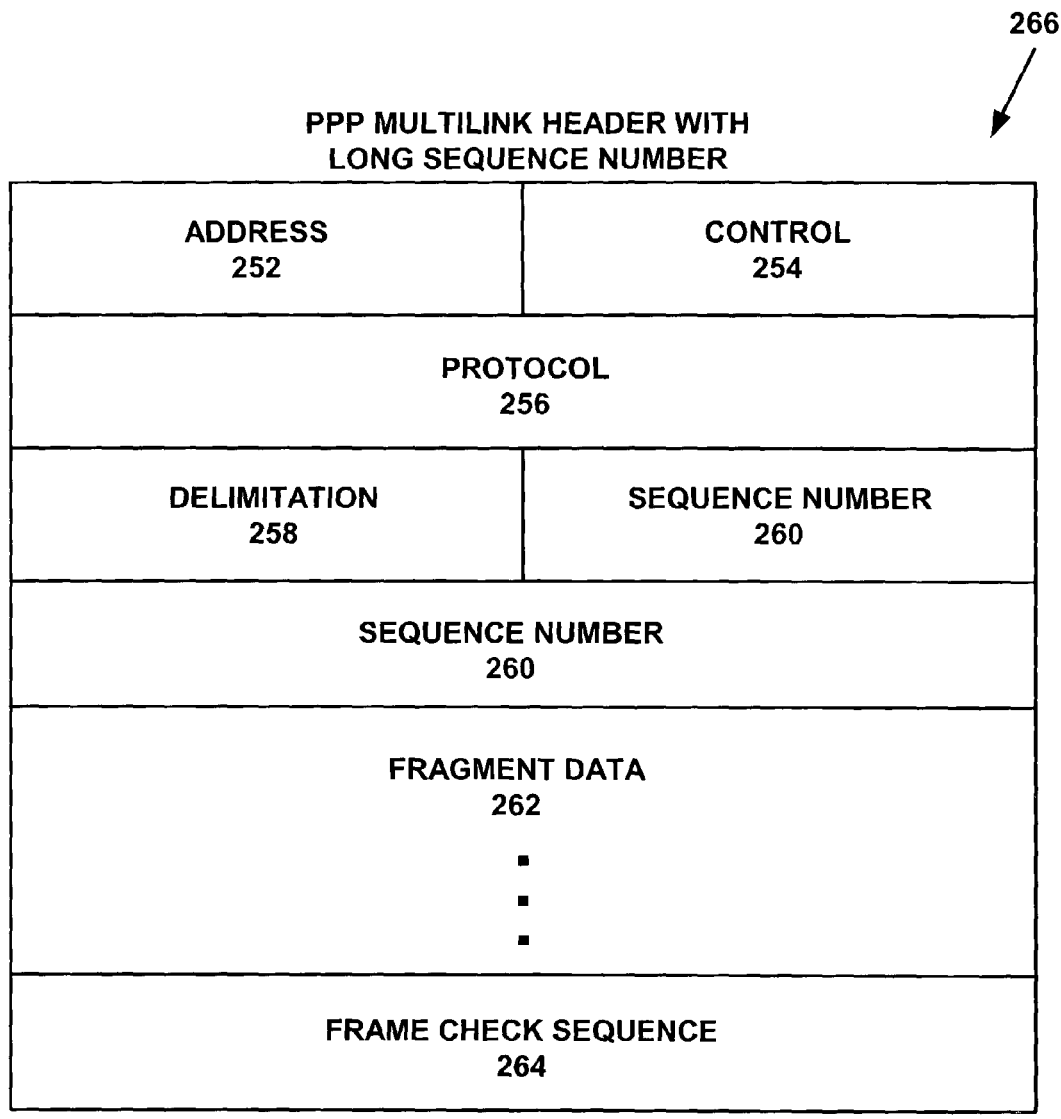
FIG. 8 is a block diagram illustrating a PPP Multilink header with a long sequence number that can be used to transmit data in the system of FIG. 1.

FIG. 8 is a block diagram illustrating a PPP Multilink header with a long sequence number 266 that can be used to transmit data in the system of FIG. 1. The PPP Multilink header with a long sequence number 266 includes an Address field 252, a Control field 254, a Protocol field 256, a Delimitation field 258, a Sequence number field 260, a Fragment Data field 262 and a Frame Check Sequence field 264. The fields serve the same functions as the fields in the PPP Multilink header with the short sequence number 250.

The Delimitation field 258 and Sequence Number field 260, however, vary from the header with the short sequence number. In the header using the long sequence number, the Delimitation field 258 is eight bits long. The first two bits are used to indicate the start and end of a sequence of fragments. The remaining six bits are set to zero. The Sequence number field 260 is twenty-four bits long, and it indicates a position of the fragment in a series of fragments forming a packet.

Of course, it should be understood that the PPP Multilink headers are merely exemplary in nature. Other headers may also be used by the client application in order to transmit packets over the multiple data channels. PPP Multilink is described in more detail in IETF RFC 1990, which is incorporated herein by reference in its entirety.

Figure 9:
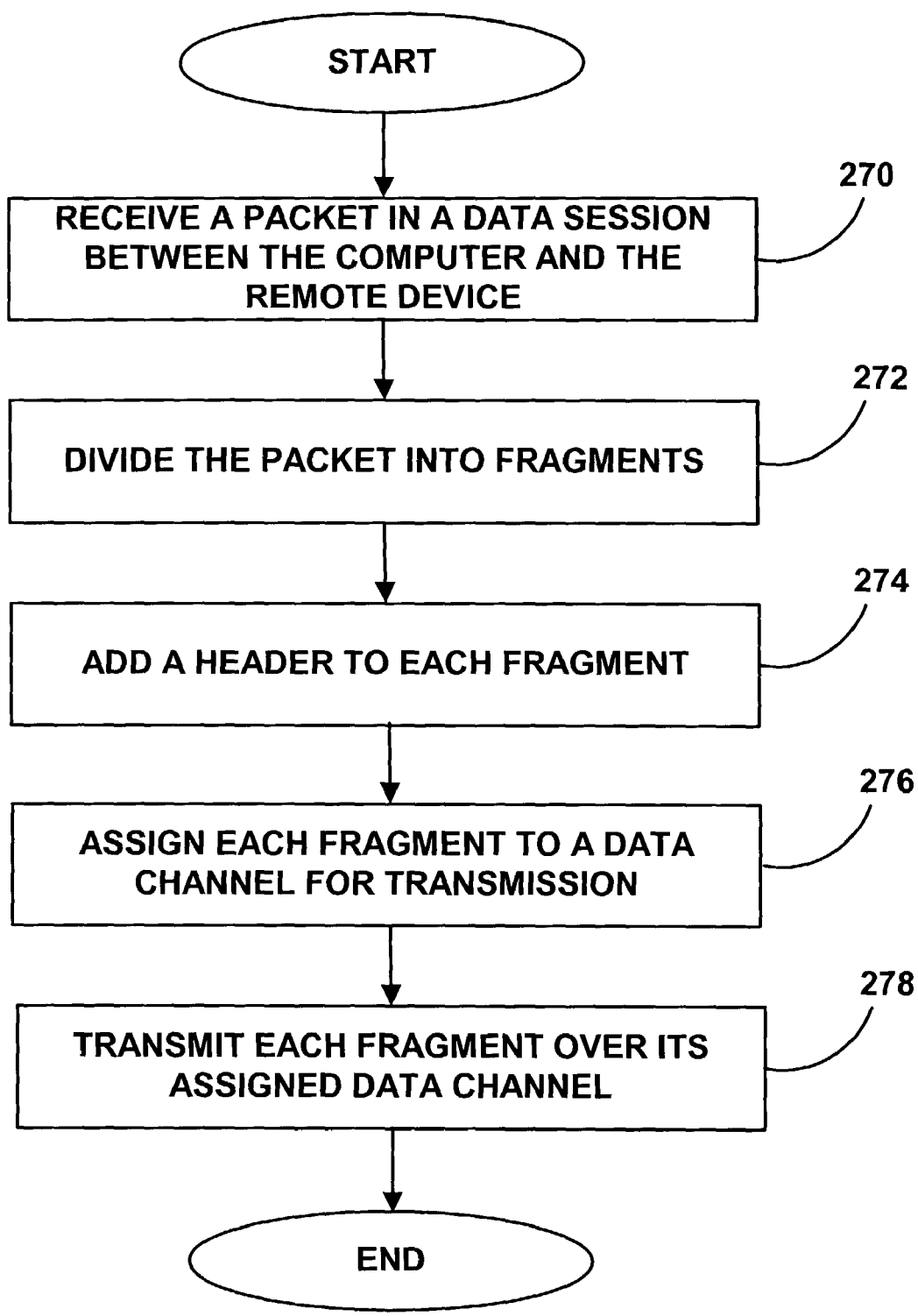
FIG. 9 is a flowchart of an exemplary process for sending data over multiple data channels.

FIG. 9 is a flowchart of an exemplary process for sending data over multiple data channels, such as can be used by the client application to send data to the server. The process can be used, for example, in the configurations depicted in FIGS. 4-6. At Step 270, the client application receives a packet in a data session between the computer and the remote device. The client application can receive the packet, for example, from an application program running on the computer 50. Next, the client application divides the packet into fragments, as shown at Step 272. At Step 274, the client application adds a header to each of the fragments. At Step 276, the client application assigns each fragment to a data channel for transmission. Then, at Step 278, the client application transmits each fragment over the fragment's assigned data channel.

The process depicted in FIG. 9 is merely exemplary in nature, and many modifications can be made. For example, as previously discussed, the client application can send the entire packet without fragmenting it into smaller portions. As another example, the client application can assign a fragment to a data channel before adding the header to the fragment. Of course, other variations are also possible.

Once the fragments are transmitted from the client application to the server via the data channels, a server application running on the server can remove the headers from the fragments and reform the original packet. The server application can be, for example, a software program that can be stored in memory and executed on a processor. The server application can reform the packet, for example, by removing the header added by the client application. If the client application fragmented the packet before transmission, the server application can then reassemble the fragments to reform the original packets. If, however, the client application did not fragment the packet before transmitting it to the server, then the server application can recover the packet by removing the header added by the client application. After reforming the original packet, the server can transmit the packed to its intended destination, such as the remote device 60.

Figure 10:
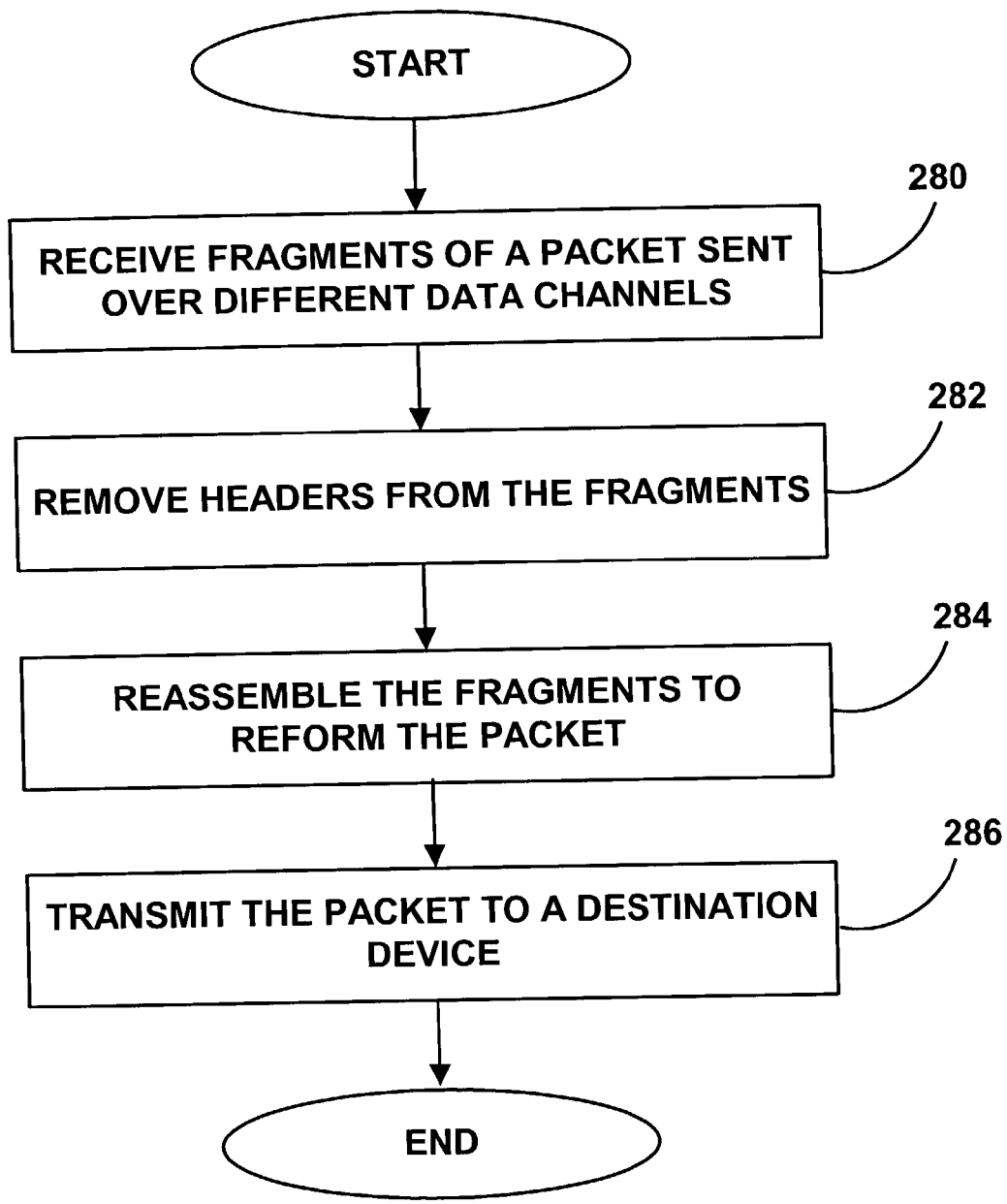
FIG. 10 is a flowchart of an exemplary process for receiving data sent over multiple data channels.

FIG. 10 is a flowchart of an exemplary process for receiving a data sent over multiple data channels, such as can be used by the server to receive data from the client application. The process can be used, for example, in the configurations depicted in FIGS. 4-6. At Step 280, the server application receives fragments of a packet sent over different data channels. Then, at Step 282, the server application removes headers from the fragments. At Step 284, the server application reassembles the fragments to reform the packet. Then, at Step 286, the server application transmits the packet to a destination device, such as the remote device 60.

A similar process can occur for packets that are sent from the remote device 60 to the computer 50. Packets sent from the remote device 60 can be routed to the server. Once received at the server, the server application can assign the packets to one of the data channels for transmission to the computer 50. The server application can also add a header onto the packets before transmitting them over one of the data channels. Optionally, the server application can divide a packet into fragment and add a header to the fragments before transmitting them over the data channels to the computer 50. The server can, for example, use the process described in FIG. 9 to receive a packet and transmit the packet over multiple data channels to the computer 50.

Once received at the computer 50, the client application can reform the original packet, such as by removing the header added by the server application. If the server fragmented the packet before transmission, the client application can reassemble the fragments to reform the original packet. Then, the reformed packet can be provided to an application program. The computer 50 can, for example, use the process described in FIG. 10 to receive the fragments transmitted over the various data channels and reform the original packet.

While the computer 50 can continuously use a static number of data channels 54, 56 to transmit data over the wireless telecommunications network 52, the computer 50 can initialize and terminate data channels 54, 56 based on bandwidth usage. For example, if the computer 50 increases its bandwidth usage, such as by sending or receiving large amounts of data, the computer 50 can initialize and use one or more additional data channels. However, if the computer 50 decreases its bandwidth usage, the computer 50 can terminate one or more data channels to reduce its available bandwidth.

Figure 11:
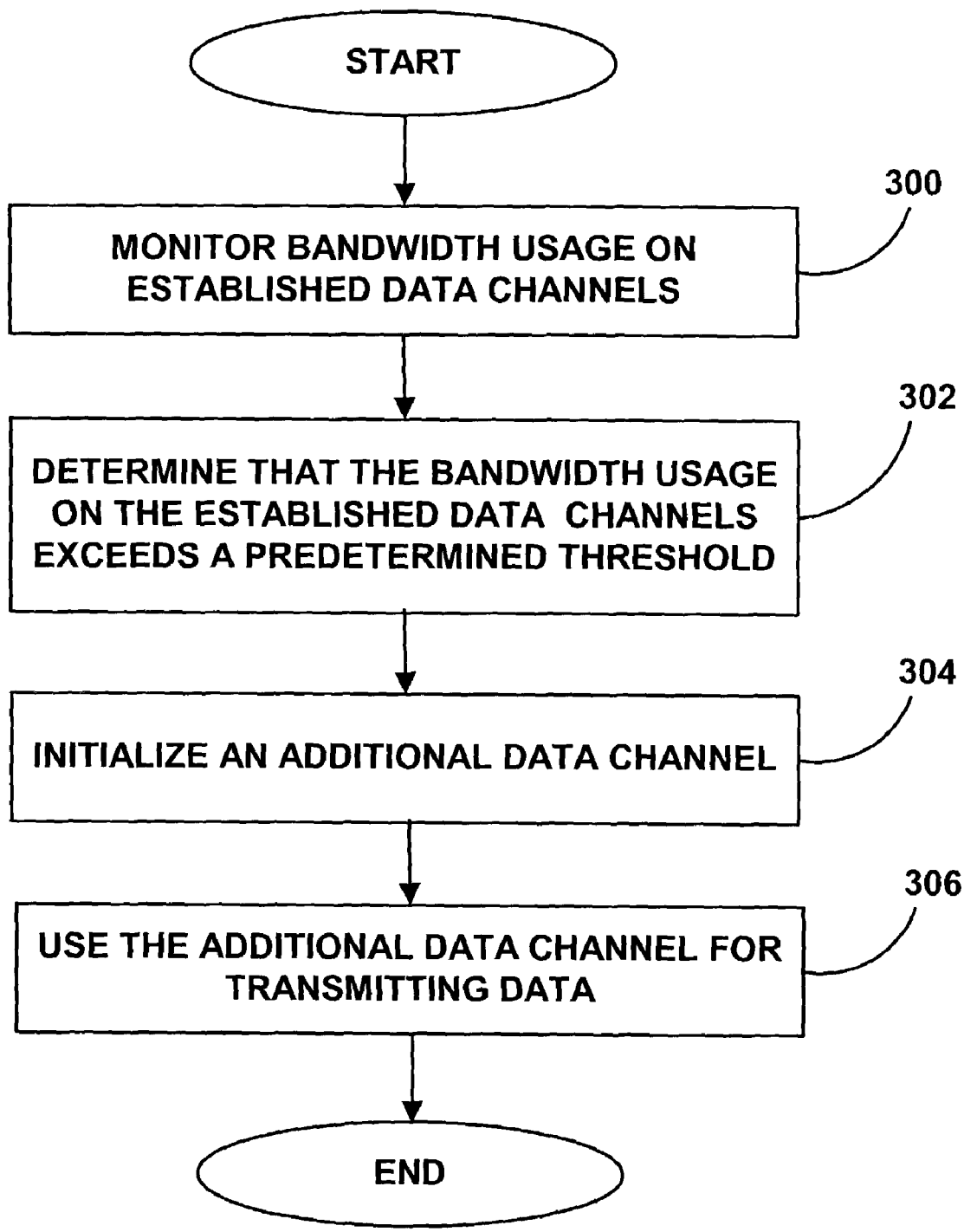
FIG. 11 is a flowchart of an exemplary process for initializing an additional data channel based on bandwidth usage.

FIG. 11 is a flowchart of an exemplary process for initializing an additional data channel based on bandwidth usage. The process can be used, for example, in the configurations depicted in FIGS. 4-6. At Step 300, the computer 50 monitors bandwidth usage on the established data channels. For example, the computer 50 may have established one or more data channels, such as a modem communicating with the PSTN 102, a wireless telecommunications network voice session, a wireless telecommunications network data session or another type of data channel. The computer 50 can use those data channels to transmit data, and it can monitor the bandwidth usage on those data channels. For example, the computer 50 can measure the number of bytes transmitted over the data channels, the number of packets transmitted over the data channels or another measure of bandwidth.

Then, at Step 302, the computer 50 determines that the bandwidth usage on the established data channels exceeds a predetermined threshold. For example, the number of bytes transmitted over the data channels may exceed a predetermined number of bytes. In another example, the number of packets transmitted over the data channels may exceed a predetermined number of packets.

The predetermined threshold can be set in a variety of different ways. For example, the predetermined threshold can correspond to a set number of units (i.e., bytes, packets or another measure) within a specified time frame. In another example, the predetermined threshold can correspond to a percentage of the available bandwidth used over a period of time. By setting the predetermined threshold to correspond to a time frame, a short increase in the bandwidth usage can be supported by the established data channels without needlessly initializing another data channel. If, however, the computer 50 detects a sustained increase in the bandwidth needed to transmit data, the computer 50 can initialize another data channel to accommodate the increase.

As shown at Step 304, the computer 50 initializes an additional data channel in response to determining that the bandwidth usage on the established data channels exceeds the predetermined threshold. The additional data channel can be one of various different types of data channels, such as an analog modem line, a wireless telecommunications network voice session, a wireless telecommunications network data session or another type of data channel. Then, the computer 50 can use the additional data channel for transmitting data, as shown at Step 306.

Of course, many variations to the process described in FIG. 11 are possible. In one alternate embodiment, the computer 50 may initialize more than one data channel at Step 304. The computer 50 may determine the number of data channels to initialize based on the increased bandwidth usage. A large increase in bandwidth usage can correspond to a greater number of initialized data channels.

In another alternate embodiment, the computer 50 can initialize additional data channels based on input received from a user. For example, the user could specify the number of data channels to establish. Additionally, the user could also specify the types of data channels to establish. The input of the user could be used in conjunction with the procedure for initializing data channels based on bandwidth usage, or it could be used in place of the procedure for initializing additional data channels based on bandwidth usage.

Adding data channels based on bandwidth usage, indications from a user or other factors can advantageously allow a user to reduce charges for using the different data channels. The user may pay for data channel usage in a variety of different ways. For example, the user may pay a flat monthly rate for phone service. Using the phone service, the user can connect to the ISP 182 through an analog phone line, and the ISP 182 can provide access to the Internet 106. Since the phone service is billed at a flat monthly rate, the user's monthly charges would remain the same regardless of how long the user was connected to the ISP 182 and how much data the user transmitted over the connection with the ISP 182.

The wireless telecommunications network 52, however, may bill differently for service. The user may access the wireless telecommunications network 52 by subscribing to service from a wireless telecommunications service provider. The wireless telecommunications service provider may charge for service based on the usage of the wireless telecommunications network 52. For example, the user may pay a flat rate for a set number of minutes of wireless telecommunications voice service. The user would then pay a per minute charge for any additional minutes. Therefore, the user's charges would increase with the amount of time the user connects to the wireless telecommunications network 52 in a voice session. Also, the user may pay a per minute charge for data sessions with the wireless telecommunications network 52. The user's charges for data sessions would then be proportional to the length of the data sessions.

Initializing additional data channels could be used to accommodate increased bandwidth while still reducing access charges. For example, the user could initially connect to the Internet using an analog phone line. Since the phone company ordinarily charges at a flat rate, the user would be billed at the flat rate regardless of the length of the connection or the amount of data transmitted. Thus, while the phone line can accommodate the needed bandwidth, the user can avoid the per minute charges that would be incurred by a second data channel through the wireless telecommunications network 52. If, however, the user needed additional bandwidth, the computer 50 could then initialize an additional data channel through the wireless telecommunications network 52. The data channel through the wireless telecommunications network 52 could be initialized in response to a need for additional bandwidth, thereby reducing the charges that would otherwise be incurred by a continuously active data channel through the wireless telecommunications network 52.

Figure 12:
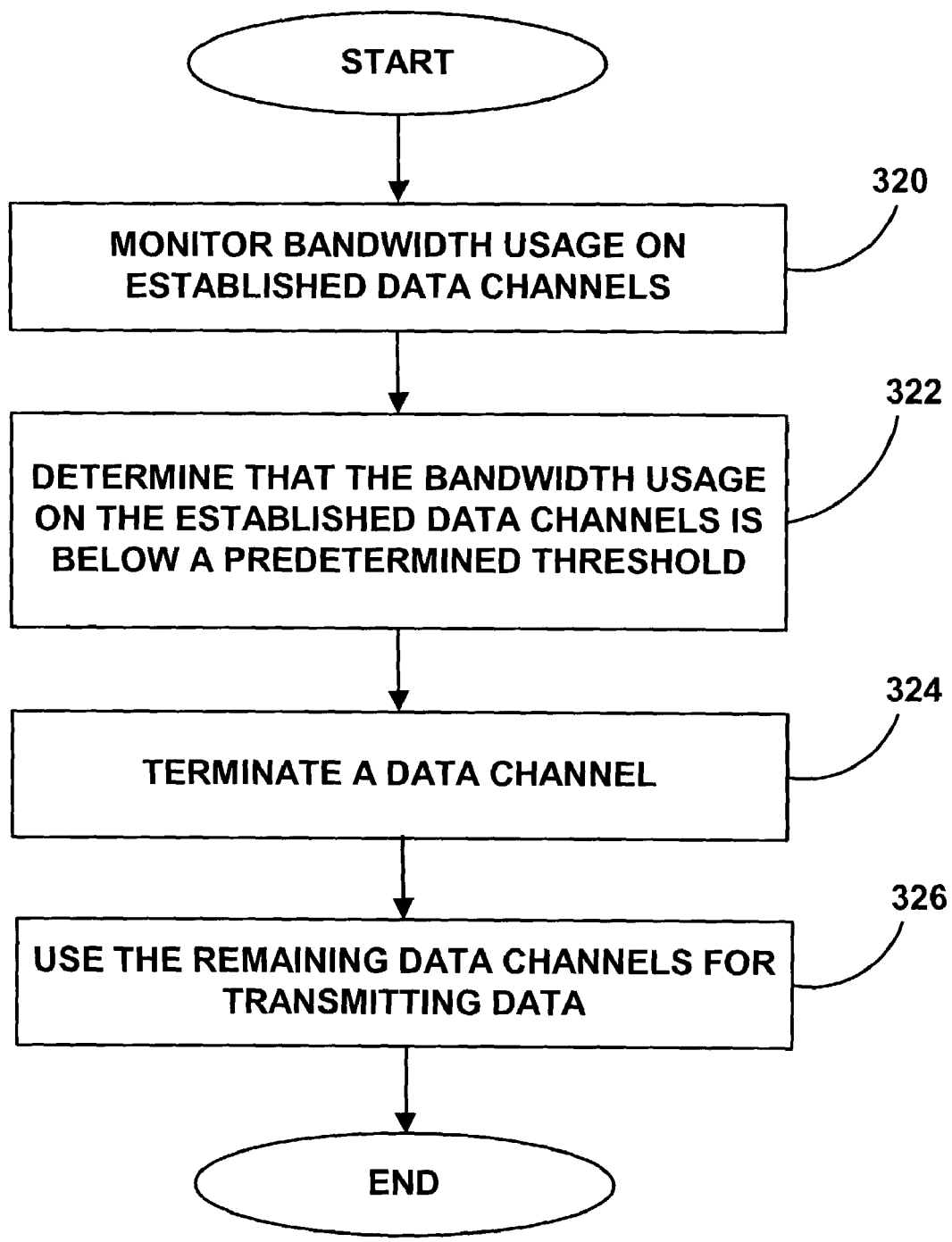
FIG. 12 is a flowchart of an exemplary process for terminating a data channel based on bandwidth usage.

FIG. 12 is a flowchart of an exemplary process for terminating a data channel based on bandwidth usage. The process can be used, for example, in the configurations depicted in FIGS. 4-6. At Step 320, the computer 50 monitors bandwidth usage on existing data channels. For example, the computer 50 can monitor the number of packets transmitted, the number of bytes transmitted or another measure.

Then, at Step 322, the computer 50 determines that the bandwidth usage on the existing data channels is below a predetermined threshold. As previously described, the predetermined threshold can be a set number of units over a period of time. Alternatively, the predetermined threshold can be a percentage of the available bandwidth used over a period of time. Of course, other measures can also be used. By basing the predetermined threshold on usage over a period of time, the computer 50 can avoid changing the number of data channels based on short variations in bandwidth usage.

Next, at Step 324, the computer 50 terminates one or more of the data channels in response to determining that the bandwidth usage is below the predetermined threshold. For example, the computer 50 could first remove wireless telecommunications network data channels in order to reduce the amount of airtime used by the user and also the per minute charges for accessing the wireless telecommunications network 52. Of course, other data channels could be terminated before terminating the wireless telecommunications network data channels. Then, at Step 326, the computer 50 uses the remaining data channels for transmitting data.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for sending data over multiple data channels, the method comprising:
   a client application running on a computer receiving a packet;
   the client application dividing the packet into at least a first fragment and a second fragment;
   the client application adding a header to each of the fragments;
   the client application assigning the first fragment for transmission over a first data channel and assigning the second fragment for transmission over a second data channel, wherein the first data channel is a wireless channel and the second data channel is a non-wireless channel;
   the computer transmitting the first fragment over the first data channel and the second fragment over the second data channel; and
   the computer determining that bandwidth usage on the wireless and non-wireless channels is below a predetermined threshold and responsively terminating either the wireless channel or the non-wireless channel.

2. A computer readable medium having stored therein instructions for causing a central processing unit to execute the method of claim 1.

3. The method of claim 1, wherein the packet is a TCP/IP packet.

4. The method of claim 1, wherein the header is a PPP Multilink header.

5. The method of claim 1, wherein transmitting the first fragment over the first data channel comprises transmitting the first fragment over the first data channel in a voice session with a wireless telecommunications network.

6. The method of claim 1, wherein transmitting the first fragment over the first channel comprises transmitting the first fragment over the first data channel in a data session with a wireless telecommunications network.

7. The method of claim 1, further comprising transmitting a third fragment over a third data channel, wherein the third data channel is a wireless data channel.

8. The method of claim 1, wherein transmitting the second fragment over the second data channel comprises transmitting the second fragment using an analog modem connection.

9. The method of claim 1, further comprising:
   the computer initializing the non-wireless channel;
   the computer determining that bandwidth usage on the non-wireless data channel is above the predetermined threshold and responsively initializing the wireless channel.

10. The method of claim 1, wherein the first data channel has a first available bandwidth and the second channel has a second available bandwidth, and wherein the method further comprises:
    distributing the fragments of the packet to the first channel and the second channel based on the first available bandwidth and the second available bandwidth.

11. A method for receiving data over multiple data channels, the method comprising:
- a computer, having a wireless interface and a non-wireless interface, accessing both a first data channel and a second data channel, wherein the first data channel is a wireless channel and the second data channel is a non-wireless channel, wherein the computer accesses the first data channel via the wireless interface and accesses the second data channel via the non-wireless interface;
- a client application running on the computer receiving fragments of a packet, wherein the fragments include at least a first fragment sent over the first data channel, and received via the wireless interface, and a second fragment sent over the second data channel, and received via the non-wireless interface;
- the client application removing a header from each of the fragments;
- the client application reassembling the fragments to form the packet; and
- the computer determining that bandwidth usage on the wireless and non-wireless channels is below a predetermined threshold and responsively terminating either the wireless channel or the non-wireless channel.

12. A computer readable medium having stored therein instructions for causing a central processing unit to execute the method of claim 11.

13. The method of claim 11, wherein the packet is a TCP/IP packet.

14. The method of claim 11, wherein the header is a PPP Multilink header.

15. The method of claim 11, wherein receiving fragments of a packet comprises receiving fragments of a packet over the first data channel using a voice session with the wireless telecommunications network.

16. The method of claim 11, wherein receiving fragments of a packet comprises receiving fragments of a packet over the first data channel using a data session with the wireless telecommunications network.

17. The method of claim 11, wherein receiving fragments of a packet comprises receiving fragments of a packet sent over a third data channel using a session with the wireless telecommunications network.

18. The method of claim 11, wherein receiving fragments of a packet comprises receiving fragments of a packet over the second data channel using an analog modem connection.

19. The method of claim 11, further comprising:
- the computer initializing the non-wireless channel;
- the computer determining that bandwidth usage on the non-wireless data channel is above the predetermined threshold and responsively initializing the wireless channel.

20. A device, comprising:
- a wireless interface;
- a non-wireless interface;
- a processor;
- memory; and
- an application, stored in the memory and configured to, in response to execution by the processor, cause the device to:
  - receive a packet,
  - divide the packet into at least a first fragment and a second fragment,
  - add a header to each of the fragments,
  - access both a first data channel and a second data channel, wherein the first data channel uses the wireless interface and the second data channel uses the non-wireless interface,
  - assign the first fragment to the first data channel and assign the second fragment to the second data channel, and
  - transmit the first fragment over the first data channel and the second fragment over the second data channel.

* * * * *